May 21, 1968  P. W. SCHUMACHER, JR  3,384,426
CONTOURED RACE FOR ROLLER BEARINGS

Filed May 14, 1965  2 Sheets-Sheet 1

Percy W. Schumacher, Jr.
INVENTOR.

BY Vincent Martin
for E. Edwards
M. Haney Gay
ATTORNEYS

May 21, 1968  P. W. SCHUMACHER, JR  3,384,426
CONTOURED RACE FOR ROLLER BEARINGS

Filed May 14, 1965  2 Sheets-Sheet 2

LOAD

LOAD

Percy W. Schumacher, Jr.
INVENTOR.

BY Vincent Martin
Joe E. Edwards
M. Harvey Gay
ATTORNEYS

United States Patent Office 3,384,426
Patented May 21, 1968

3,384,426
CONTOURED RACE FOR ROLLER BEARINGS
Percy W. Schumacher, Jr., Houston, Tex., assignor to Reed Roller Bit Company, Houston, Tex., a corporation of Texas
Filed May 14, 1965, Ser. No. 455,881
8 Claims. (Cl. 308—8.2)

ABSTRACT OF THE DISCLOSURE

In bearing assemblies for roller cutter earth drilling bits, applicant provides a new and improved bearing arrangement for anti-friction bearings whereby the operating loads imposed on the stationary race of a bearing assembly through such anti-friction bearings are better distributed and the arrangement permits a larger number of anti-friction bearings to carry such loads at any given time.

In order to alleviate bearing failures, applicant proposes to contour or shape the load-side of the stationary race (the shaft) so that during operation more anti-friction bearings are in contact therewith at any given time, thereby transmitting the opering loads through more roller bearings and therefore to more area on the shaft to distribute the load thereon, thereby providing a more effective shaft load area whereupon the useful life of the bearing assembly is enhanced. In other words, there is provided a bearing structure wherein the contoured race portion comprises a flattened surface.

---

This invention relates to bearings of the friction and friction and anti-friction type, and may find particular use, for example, in bearing assemblies for roller cutter earth drilling bits.

An object of the invention is to provide a new and improved bearing which has increased useful life.

Another object is to provide a new and improved bearing race for a bearing assembly.

Another object is to provide a new and improved bearing arrangement for bearings whereby the operating loads imposed on the stationary race of a bearing assembly are better distributed.

A particular object of the invention is to provide a new and improved bearing arrangement for anti-friction bearings whereby the operating loads imposed on the stationary race of a bearing assembly through such anti-friction bearings are better distributed and whereby the arrangement permits a large number of anti-friction bearings to carry such loads at any given time.

Another object is to provide a new and improved bearing assembly wherein the stationary race thereof is contoured on its load side to provide more effective bearing area.

Another specific object is to provide a new and improved bearing assembly for roller cutter drilling bits to increase the useful life of such bits without materially increasing the manufacturing costs thereof.

Other objects of the invention will become apparent from the following description and accompanying drawings in which.

Figure 3:
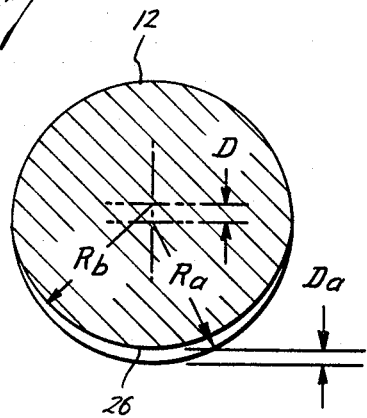
FIGURE 3 is a sectional view taken along line 3—3 in FIGURE 2.
Figure 4:
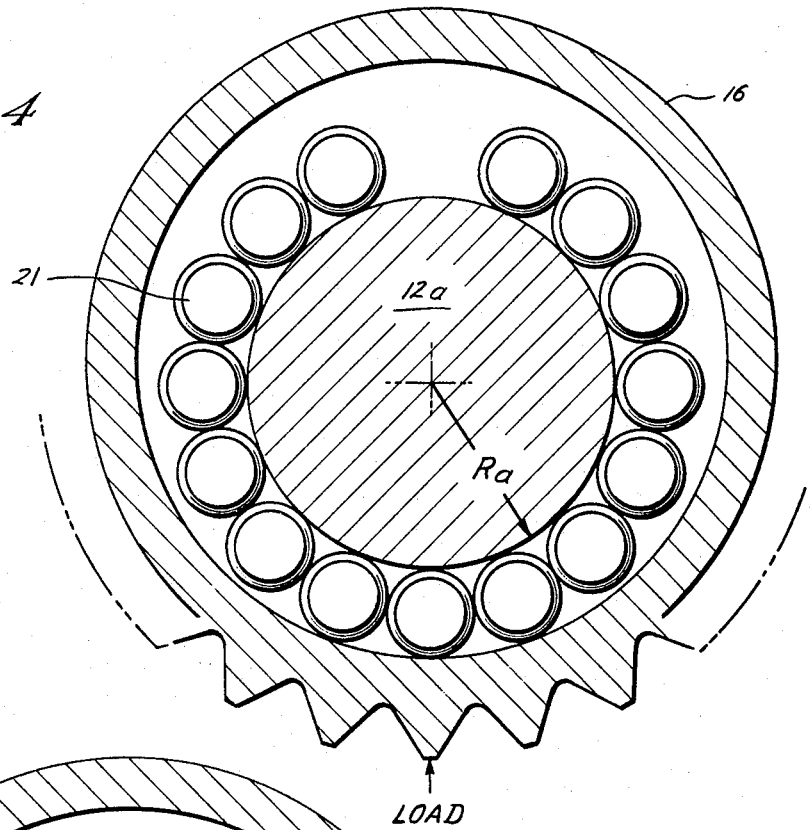
FIGURE 4 is a cross-sectional view taken through a drill bit cutter and its bearings showing a conventional relationship of such bearings to the shaft and the cutter.
Figure 5:
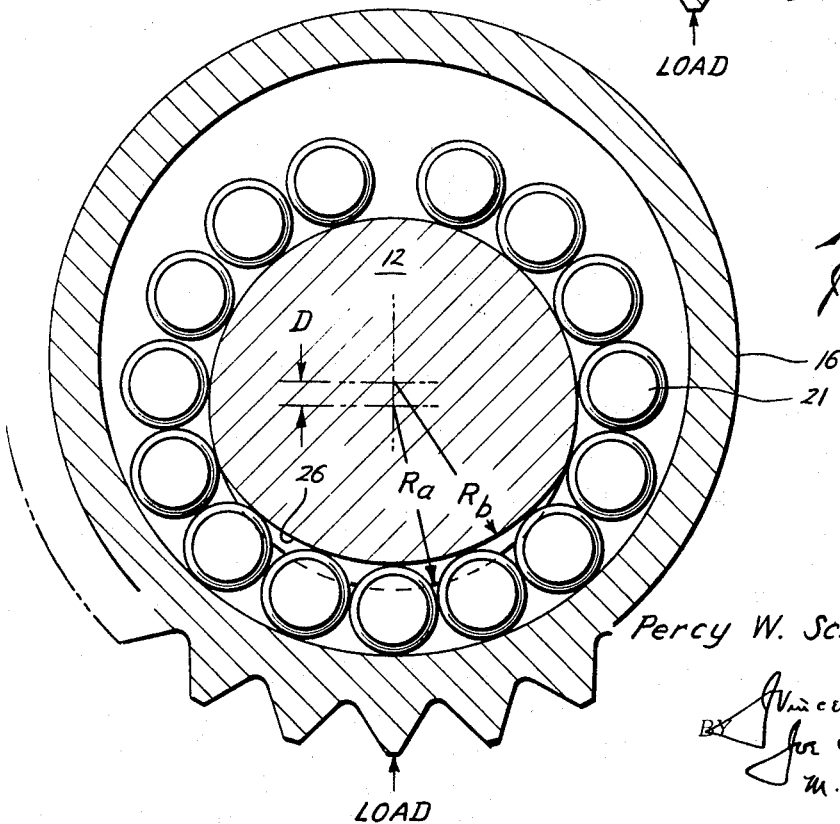
FIGURE 5 is a view similar to FIGURE 4 disclosing the construction of the bearing arrangement according to the invention.

In FIGURES 3, 4 and 5, the dimensional differences, fits and clearances have been exaggerated for purposes of illustration.

Figure 1:
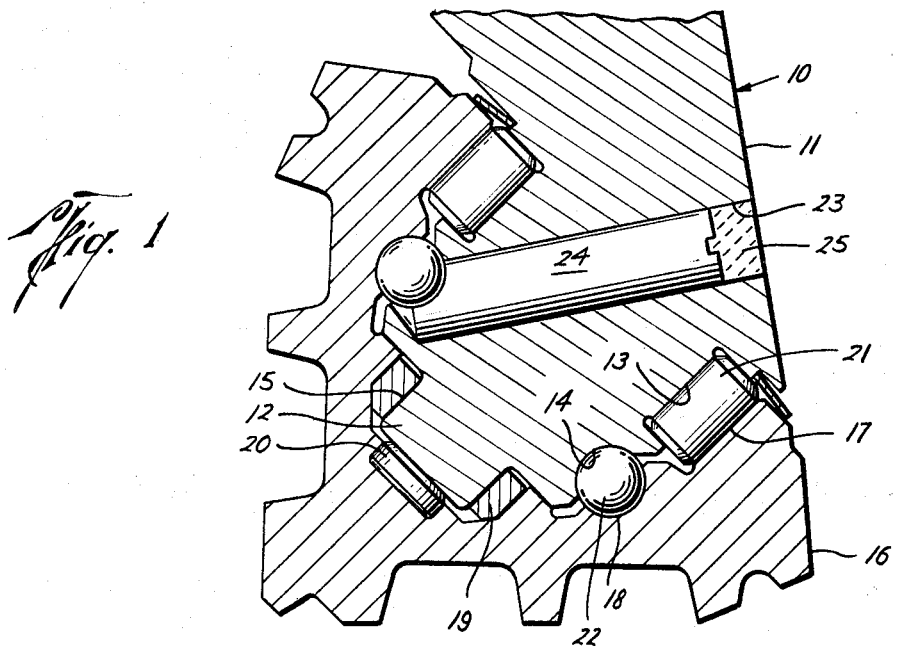
FIGURE 1 is a vertical sectional view of a part of a drill bit showing a roller cutter bearing assembly.
Figure 2:
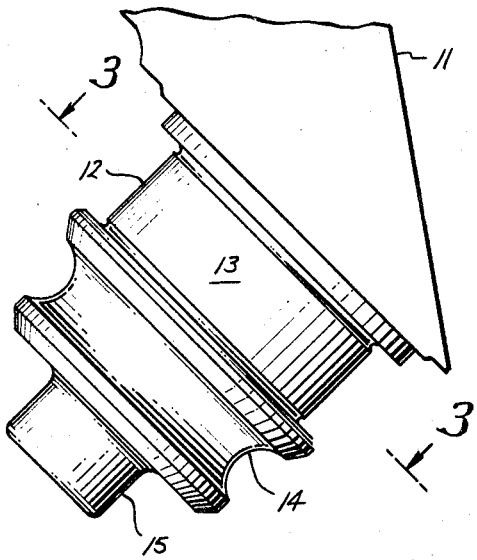
FIGURE 2 is a side elevation of a part of the bit shown in FIGURE 1 showing the shaft and the bearing races thereon.

Drilling bits employing bearing assemblies similar to that shown in FIGURE 1 are used in the drilling of oil and gas wells. As can be seen, the shaft, or inner race, thereof is stationary with respect to the relative rotation thereon of the roller cutter. In the drilling of such wells, the drill bit is subjected to severe shocks and wear which are caused by a combination of impact and abrasion and high operating loads. An 8¾" diameter bit, for example, may be operated under a drilling weight of 70,000 pounds or more, and each of the bearing assemblies thereof may sustain an average operating load of several tons. However, the peak loads imposed on the bearings may be much higher since the weight does not rest on the bearings uniformly but is transmitted in the form of shocks and vibrations. The load imposed on the anti-friction roller bearings, for example, is usually carried by one or two rollers at any given instant, with a corresponding concentrated load being transmitted therethrough to the stationary inner race or shaft. The shaft is usually made of a carburizing grade of steel and is carburized or case hardened to a range of from 57 to 62 Rockwell C to increase its wear resistance. However, because of the high concentrated forces imposed on the shaft during drilling operations, the shaft race will eventually spall or chip, and such spalling or chipping is self-aggravating and the shaft race damage leads to failure of the drill bit bearing and the consequent failure of the drill bit.

In view of the foregoing objects and in order to alleviate bearing failures such as that just described, I propose to contour or shape the load side of the stationary race (the shaft in the illustrated case) so that during operation more anti-friction bearings are in contact therewith at any given time, thereby transmitting the operating loads through more roller bearings and therefore to more area on the shaft to distribute the load thereon, thereby providing a more effective shaft load area whereupon the useful life of the bearing assembly is enhanced.

The illustrative embodiment of the invention shown in FIGURE 1 comprises a bit head 10 having a downwardly extending leg 11. Extending inwardly and downwardly from the leg 11 is a shaft 12 having thereon a roller bearing race 13 and a ball bearing race 14 and a friction pin 15. A roller cutter 16 is disposed over the shaft and has an interior roller race 17 and an interior ball race 18 and a bushing 19 which bushing is arranged to rotate upon the friction pin 15. A thrust button 20 is provided in the cutter 16 and is arranged to resist outward axial loads imposed upon the cutter 16. Roller bearings 21 are installed in the raceways 13 and 17 and ball bearings 22 are installed in the raceways 14 and 18. The ball bearings 22 being inserted into position through the bore 23 after which a plug 24 is inserted into the bore and welded into position as shown at 25.

FIGURE 4 is a cross-sectional view taken through the cutter 16, bearings 21 and a conventional shaft 12a. The shaft is generally cylindrical about a single radius point on the radius Ra. The load as illustrated is imposed on the bottom of the cutter, through the bearings and onto the shaft 12a, during the drilling operation. The conventional shaft shown in this figure employs fifteen roller bearings, the load being imposed on the bottom of the cutter through three bearings and onto the shaft 12a.

Referring to FIGURE 5, a cross-sectional view through the cutter 16, the bearings 21 and the shaft 12 is shown, showing the construction of the bearing arrangement according to the invention. As can best be seen in FIG- URES 3 and 5, the shaft 12 has its lowermost portion contoured as shown at 26. In this construction, wherein substantially all dimensions are taken from the construction of FIGURE 4, the conventional construction, there are fifteen roller bearings, the load being imposed on the bottom of the cutter through three to five bearings, two more bearings than in the construction shown in FIGURE 4.

By way of example, and referring to FIGURE 3, the shaft 12 may have a radius $Ra$ of 1″ about the nominal center of the shaft. A radius $Rb$ may be struck eccentrically to the radius point of radius $Ra$ by a matter, for example, of ten thousandths of an inch as illustrated by the dimension D. The radius $Rb$ may be 1.005″, and the shaft when thus contoured will result in the removal of .005″ from the bottommost portion thereof, and a lesser amount on either side of said portion. In other words, a small crescent-shaped portion is removed from the load side of such shaft race.

In the example just given, the bearings on the load side will operate on a shaft portion having a radius of 1.005″ and thus the bearings in effect are operating on an "oversized" shaft, which results in the operating loads being imposed on more bearings in such area at any given time, thereby more efficiently distributing such loads to effect longer operating life of such bearing assembly and especially of the shaft 12.

With the bearing shaft contoured as just described, the operating loads imposed thereon through the cutter and bearings may be transmitted through three to fiive bearings, see FIGURE 5, whereas, in the conventional bearing structure shown in FIGURE 4, the operating load transferred to shaft 12a ordinarily is transmitted through two or three bearings only at any given moment.

The bearing structure of the invention also provides sufficient clearance to enable the cutter to be easily installed over such bearings and shaft.

It will of course be apparent that the contoured portion of the shaft 12, as shown at 26, may be of any suitable arcuate shape such as a portion of an ellipse; or the shaft may be slightly flattened in this area and faired-in to the remainder of the shaft by suitable radii. It will also be understood that the bearing structure of the invention is applicable to ball bearings, as well as roller bearings, and that while here the inner race or shaft is shown to be stationary, the invention envisions also a bearing assembly wherein the inner race or shaft may rotate with respect to the outer race, which is the cutter in this case, whereupon the stationary race taken with respect to the rotating parts would be flattened in the loaded area in a manner similar to that just described for the shaft. In other words, the relatively rotatably stationary part of the bearing is contoured on the load side so that more bearings will contact such area during the operation thereof to better distribute loads to such stationary part.

While the shaft may be contoured in various manners, it is satisfactory to first turn the raceways on its nomial center and then turn or oscillate such shaft about a center eccentric to the nominal center to remove a crescent-shaped portion. Such contouring may also be effected by means of grinding.

The invention is not limited to the embodiment shown. Various changes within the scope of the following claims will be apparent to those skilled in the art.

I claim:

1. A drill bit roller bearing structure adapted to support a load from a given direction comprising a stationary inner race, an outer race, roller bearings disposed between said inner and outer races, the outer race being disposed on said roller bearings and rotatable thereon about said inner stationary race, the unloaded surface of the inner race being generally cylindrical about a radius from a first radius point, the loaded portion of said inner race surface being contoured so that its lowermost surface is closer to said first center than said unloaded surface, the loaded surface being described by a radius larger than the radius of said unloaded surface and struck from a second radius point eccentric to said first radius point.

2. A roller bearing structure adapted to support a load from a given direction comprising a stationary inner race, an outer race, roller bearings disposed between said inner and outer races, the outer race being disposed on said roller bearings and rotatable thereon about said inner stationary race, the unloaded surface of the inner race being generally cylindrical about a radius from a first radius point, the loaded portion of said inner race surface being contoured so that its lowermost surface is closer to said first center than said unloaded surface, the loaded surface being described by a radius larger than the radius of said unloaded surface and struck from a second radius point eccentric to said first radius point.

3. A bearing structure adapted to support a load from a given direction comprising a stationary iner race, an outer race, bearings disposed between said inner and outer races, the outer race being disposed on said bearings and rotatable thereon about said inner stationary race, the unloaded surface of the inner race being generally cylindrical about a radius from a first radius point, the loaded portion of said inner race surface being contoured so that its lowermost surface is closer to said first center than said unloaded surface, the loaded surface being described by a radius larger than the radius of said unloaded surface and struck from a second radius point eccentric to said first radius point.

4. A bearing structure adapted to support a load from a given direction comprising a fixed race, a rotatable race, anti-friction bearings disposed between said races, the rotatable race being disposed on said bearings and rotatable thereon on said fixed race, the unloaded surface of the fixed race being generally cylindrical about a radius from a radius point, the loaded portion of said fixed race surface being contoured so that its lower surface is closer to said radius point than said unloaded surface.

5. A bearing structure according to claim 4 wherein the contoured race portion comprises a flattened surface.

6. A bearing structure according to claim 4 wherein the load side of the fixed race is noncircular.

7. A bearing structure according to claim 4 wherein said contoured surface describes a portion of an ellipse.

8. A drill bit bearing assembly having a shaft, bearings and a cutter rotatably mounted on said shaft, the nether portion of said shaft being slightly flattened so that loads applied to the cutter during drilling operations are efficiently distributed on the shaft through said bearings.

References Cited

UNITED STATES PATENTS

| | | | |
|---|---|---|---|
| 3,321,256 | 5/1967 | Orain | 308—190 |
| 2,329,751 | 9/1943 | Fermier | 308—8.2 |
| 2,444,724 | 7/1948 | Brown | 308—174 X |
| 3,183,044 | 5/1965 | Peter | 308—8.2 |
| 3,203,492 | 8/1965 | Lichte | 308—8.2 X |

EVERETTE A. POWELL, JR., *Primary Examiner.*